Patented Apr. 2, 1935

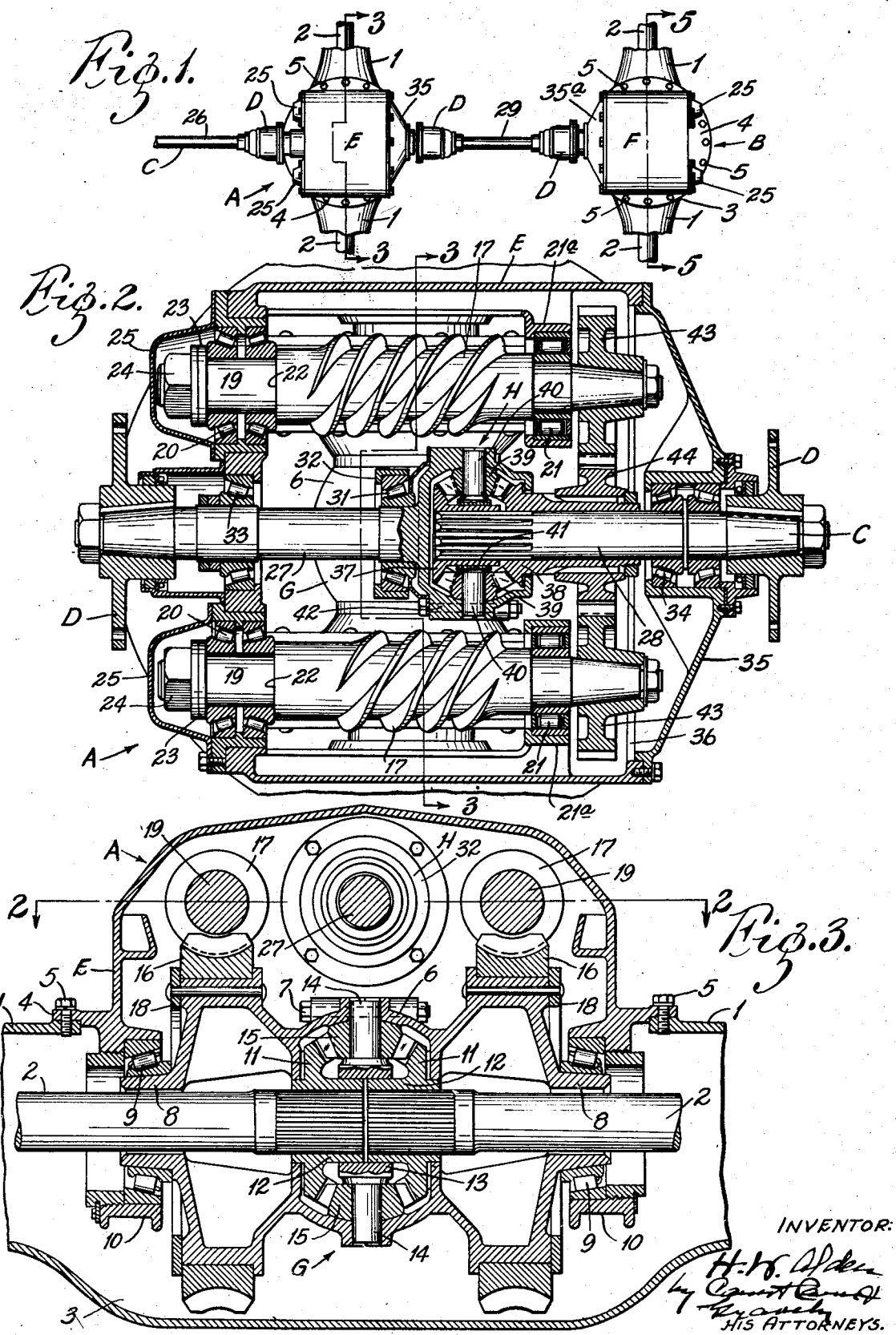

1,996,138

UNITED STATES PATENT OFFICE 1,996,138

AUTOMOTIVE DRIVING AXLE CONSTRUCTION

Herbert W. Alden, Detroit, Mich., assignor to The Timken-Detroit Axle Company, Detroit, Mich., a corporation of Ohio Application August 10, 1932, Serial No. 628,141

7 Claims. (Cl. 180—22)

This invention relates principally to automotive driving axle constructions comprising two differential driving axles that are differentially driven by a third differential mechanism mounted in one of said axles. The invention has for its principal objects to provide a simple, strong and compact construction whereby all of the drive gearing in each axle may be attached to and removed from said axle as a unit; to provide for transmitting a greater amount of power to each axle without making the final driving gears larger than the requirements of road clearance will permit; to provide a simple and compact arrangement for supporting the third differential in one axle in axial alinement with the propeller for both axles; to enable said third differential mechanism to be mounted on and removed from its supporting axle with the drive gearing therefor as a unit; to provide a substantially straight propeller shaft for said axles; and to provide for the ready inspection and removal of the gears and the adjustment of the bearings therefor. The invention consists in the parts and in the combinations and arrangements of parts hereinafter described and claimed.

Figure 4:
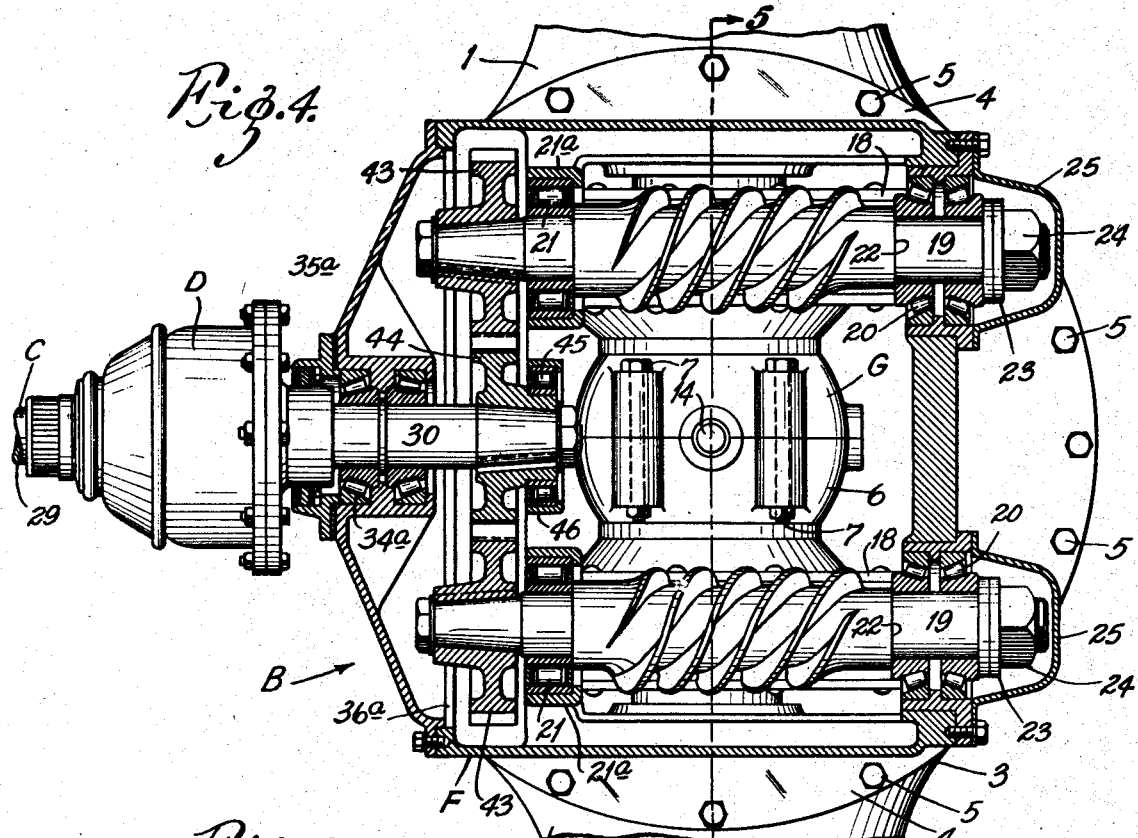
Figure 5:
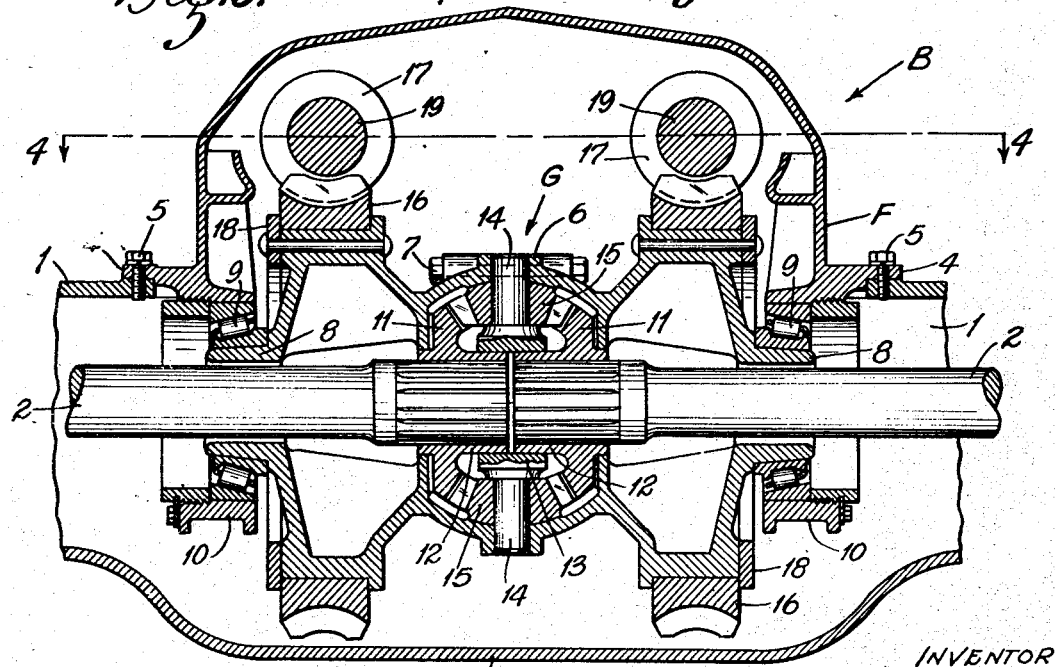

In the accompanying drawings which form part of this specification and wherein like symbols refer to like parts wherever they occur, Fig. 1 is a plan view of the middle portion of the dual differential driving axle unit embodying my invention, Fig. 2 is a horizontal section through the upper portion of the gear carrier for the front axle on the line 2—2 in Fig. 3, Fig. 3 is a vertical central longitudinal section through the front axle on the line 3—3 in Fig. 2, Fig. 4 is a horizontal section through the rear axle, the section being taken through the upper portion of the gear carrier therefor on the line 4—4 in Fig. 5, and Fig. 5 is a vertical longitudinal section through the middle portion of the rear axle on the line 5—5 in Fig. 4.

Referring to the accompanying drawings, my invention is shown in connection with a dual driving axle unit of the kind used with six and eight wheeled motor vehicles. Said unit comprises two differential driving axles, one front or through drive axle A and one rear or final drive axle B. The two axles are driven by a sectional drive or propeller shaft C, which extends from the usual change speed mechanism (not shown) through the front axle to the rear axle with its sections connected together by the usual universal joints D. Each of the driving axles, A and B, comprises a conventional load supporting housing having tubular end portions 1, which are adapted to receive the axle shaft sections 2, and an enlarged middle portion 3, which is adapted to receive a suitable differential mechanism G through an opening located preferably in the top of said enlarged middle portion. Gear carriers E and F are removably secured to the tops of the bowl-shaped middle portions 3 of the axle housings of the driving axles A and B, respectively, and are adapted to support the differential mechanism G and the drive gearing therefor, said gear carriers covering the opening in the bowl-shaped middle portions of the respective axle housings and being provided with circular flanges 4 that are removably secured to said axle housings by cap screws 5.

The differential mechanism G for each driving axle is enclosed within a split casing 6 that consists of duplicate half sections that are removably secured together at their opposing ends by means of bolts 7. The differential gear casing 6 is provided at its opposite ends with axially alined hubs 8 that are adapted to loosely receive the axle shaft sections 2. The hubs 8 of the differential gear casing 6 are journaled in suitable anti-friction bearings 9 provided therefor in horizontally split journal boxes 10 that depend from the gear carrier whereby said differential gear casing, the differential mechanism G therein, and said antifriction bearings are all removable from the axle housing with said carrier as a unit. The differential mechanism G for each axle preferably comprises two opposed bevel side gears 11, which are splined on the adjacent inner ends of the axle shaft sections 2 of said axle and have hubs 12 that extend towards each other and are journaled in a spider 13. Said spider has radially extending stub shafts 14 that rotate with the differential gear casing 6 and has bevel pinions 15 journaled thereon that intermesh with the two bevel side gears 11.

The differential gear casing 6 of each driving axle is driven by means of two sets of worm gearing, located one on each side of the transverse center line of said differential gear casing. Each set of worm gearing comprises a worm gear ring 16 that is driven by an overhung worm 17. The worm gear ring 16 is seated in an outwardly opening annular groove formed in the differential gear casing concentric with the axis thereof, the inner wall of said groove being formed integral with the differential gear casing and the outer wall thereof being formed by an annular plate 18 riveted to said differential gear casing. The worms 17 of the two sets of worm gearing for each axle are preferably formed integral with parallel shafts 19 located in the upper portion of the differential gear carrier for said axle. The two worm shafts 19 extend transverse to the axle axis and are spaced apart equal distances on opposite sides of the transverse center line of the differential gear casing 6. One end of each worm shaft 19 is rotatably supported in a suitable double anti-friction bearing 20 mounted in an opening provided therefor in one end wall of the carrier therefor; and the opposite end of said worm shaft is rotatably supported in a suitable single anti-friction bearing 21 mounted in a suitable journal box 21a that projects inwardly from the adjacent side wall of said carrier. Each worm shaft 19 is provided with a shoulder 22, which abuts against the inner end of the double anti-friction bearing 20 therefor, and washers 23, which abut against the outer end of said bearing and are held in contact therewith by means of a nut 24 threaded on the adjacent end of said shaft. The opening for said worm shaft bearing 20 is closed by means of a suitable cap 25, which is removably secured to the carrier and is shaped to cover the nut 24 on the end of said worm shaft.

The sectional propeller or drive shaft C for the dual axle unit preferably comprises a section 26 leading from the transmission gearing (not shown) to the front or through drive axle A, sections 27 and 28 mounted in the gear carrier E of said front or through drive axle A, a section 29 extending from axle to axle, and a section 30 mounted in the gear carrier F of the rear or final drive axle B. The rear end of the propeller shaft section 27 in the front axle gear carrier E is supported in a suitable antifriction bearing 31 mounted in a suitable journal box 32 that depends from the top wall of said gear carrier E; and the opposite or forward end of said propeller shaft section 27 is supported in a suitable antifriction bearing 33 mounted in the front end wall of said gear carrier E. The rear end portion of the other propeller shaft section 28 of the front axle A is supported in a suitable double antifriction bearing 34 mounted in a cover 35 that closes a gear receiving opening 36 in the rear wall of the gear carrier E for said axle; and likewise, the propeller shaft section 30 in the rear axle gear carrier F is mounted in a suitable double bearing 34a mounted in a cover 35a that covers a gear receiving opening 36a in the front wall of said gear carrier F.

The two axially alined propeller shaft sections 27 and 28 in the front axle gear carrier E are operatively connected at their adjacent ends by means of differential gear driving mechanism H including two opposed bevel side gears 37 and 38, the side gear 37 being splined on the propeller shaft section 28 for rotation therewith and the other side gear 38 being journaled on said propeller shaft section for rotation relative thereto. The two opposed bevel side gears 37 and 38 are driven by means of bevel pinions 39 mounted on the radially extending studs 40 of a spider 41, which surrounds the hub of the bevel side gear 37 that rotates with the propeller shaft section 27. The studs 40 of the spider 41 are attached to and rotate with a transversely split casing 42 which encloses the differential gearing, one section of said casing being formed integral with the adjacent end of the propeller shaft section 27

Each worm shaft 19 of each axle is provided adjacent to the bearing 21 therefor with a spur gear 43. The pair of spur gears 43 of each axle intermesh with and are driven by a spur pinion 44 on the propeller shaft C. The spur pinion that drives the pair of spur gears in the front axle is splined on the hub of the bevel side gear 38 of the third differential mechanism H; and the spur pinion for driving the pair of spur gears in the rear axle is fixed to the rear end of the propeller shaft section 30 therein and has its hub journaled in a suitable antifriction bearing 45 mounted in a journal box 46 that depends from the top of the rear axle gear carrier F. The openings 36 and 36a in the gear carriers E and F, respectively, are made large enough to permit the spur gears 43 and 44 to be inserted in and withdrawn from the respective gear carriers through said openings. The third differential mechanism H may also be inserted in and removed from the front axle gear carrier through the opening 36 therein. The worm shafts 19 are inserted in and removed from the gear carrier through the openings in which the double bearings 20 are mounted.

By the arrangement described, power delivered from the engine to the sectional through drive propeller shaft C is transmitted to the third differential H in the front driving axle A, and thence through the two sets of worm gearing of each axle to the differential driving mechanism G thereof. The third differential mechanism H serves to differentially drive the differential mechanism G of the two driving axles, and said last mentioned differential mechanisms, in turn, serve to differentially drive the axle shaft sections 2 of the respective axles. The work that heretofore has been done with a single set of worm gears is divided between two sets of worm gears, thereby making it feasible to transmit considerable more power to each axle without increasing the diameter of the gears and without cutting down the body of road clearance.

It is noted as an important advantage of my invention that it provides a substantially straight through drive between the two axles for differentially driving them, thereby decreasing the working angle of universal joints of the sectional propeller shaft; it also locates the sectional propeller shaft along the center line of the vehicle in line with the engine; and it also places the differential in axial alinement with said sectional propeller shaft and furnishes a simple and compact mounting for said differential in the gear carrier of the front or through drive axle. Another advantage of my invention is that it enables the final drive gearing, together with the shafts and supporting bearings therefor, to be attached to and detached from the axle housing with the carrier as a unit; and it also permits the third differential gearing to be removed with or separately from the gear carrier of the front axle.

Obviously, the hereinbefore described construction admits of considerable modification without departing from the invention. Therefore, I do not wish to be limited to the precise details of construction shown and described.

What I claim is:

1. A dual axle unit comprising two differential driving axles, a differential gear casing mounted in each axle, a sectional propeller shaft extending from axle to axle, two worm gears rotatable with the differential gear casing of each axle, two parallel shafts mounted in each axle and arranged one on each side of a section of said propeller shaft and provided with worms meshing with the worm gears of said differential casing, gearing operatively connecting said propeller shaft with the two worm shafts of each axle, and a carrier removably secured to each axle and supporting the propeller shaft section, the worm shafts on opposite sides of said section and the gearing therebetween, and the differential gear casing and the worm gears thereon.

2. A through drive differential driving axle construction comprising a differential driving mechanism, a propeller shaft comprising two axially alined sections extending transversely of said axle, a differential mechanism operatively connecting adjacent ends of said propeller shaft sections, said last mentioned differential mechanism including two gears on one of said propeller shaft sections, one rotatable with and the other rotatable on said section, two shafts provided with worms and disposed parallel with and on opposite sides of said propeller shaft sections, worm gears intermeshing with the respective worm shafts and operatively connected to said first mentioned differential driving mechanism, gears on said worm shafts, and a pinion meshing with said gears, said pinion being rotatable with one of the two gears on said propeller shaft section.

3. A through drive differential driving axle construction comprising an axle housing, a differential driving mechanism, a propeller shaft comprising two axially alined sections extending transversely of said axle, a differential mechanism operatively connecting adjacent ends of said propeller shaft sections, said last mentioned differential mechanism including two gears on one of said propeller shaft sections, one rotatable with and the other rotatable on said section, two shafts provided with worms and disposed parallel with and on opposite sides of said propeller shaft sections, worm gears intermeshing with the respective worm shafts and operatively connected to said first mentioned differential driving mechanism, gears on said worm shafts, and a pinion meshing with said gears, said pinion being rotatable with the gear that rotates on one of said propeller shaft sections, and a carrier removably secured to said axle housing and supporting the two differential mechanisms, the two propeller shaft sections, the two sets of worm gearing and said pinion and said gears.

4. A through drive differential driving axle construction comprising an axle housing, a differential driving mechanism, a propeller shaft comprising two axially alined sections extending transversely of said axle, a differential mechanism operatively connecting adjacent ends of said propeller shaft section, said last mentioned differential mechanism including two gears on one of said propeller shaft sections, one rotatable with and the other rotatable on said section, two shafts having worms thereon and disposed parallel with and on opposite sides of said propeller shaft sections, gears intermeshing with the respective worm shafts and operatively connected to the first mentioned differential driving mechanism, gears on said worm shafts, and a pinion meshing with said gears and rotatable with the gear that rotates on one of said propeller shaft sections, and a carrier removably secured to said axle housing and supporting the two differential mechanisms, the two propeller shaft sections, the two worm gears, and the pinion and the gears intermeshing therewith, said carrier being provided with an opening through which said pinion and gears and said propeller shaft differential may be inserted in and removed from said carrier.

5. A dual driving axle unit comprising a through drive axle and a final drive axle, each axle including a differential driving mechanism therefor, two axially alined propeller shaft sections mounted in the through drive axle, a differential mechanism mounted in said through drive axle in axial alinement with and operatively connecting the adjacent ends of the two axially alined propeller shaft sections therein, a propeller shaft section mounted in the final drive axle, a propeller shaft section connecting the propeller shaft section of the two axles, two sets of worm gearing mounted in each axle, one on each side of the propeller shaft axis, and driving connections between the propeller shaft differential and the two sets of worm gearing in each axle, the propeller shaft differential mechanism of the through drive axle being disposed between the two sets of worm gearing therein.

6. A dual driving axle unit comprising a through drive axle and a final drive axle, a differential gear case mounted in each axle, two gears rotatable with the differential gear case of each axle, two spaced parallel shafts mounted in each axle and having driving connections with the two gears therein, a propeller shaft extending from axle to axle between the two spaced parallel shafts therein, said propeller shaft comprising two sections journaled in the through drive axle, a section leading to the final drive axle and a section journaled in said last mentioned axle, and a differential driving mechanism mounted in the through drive axle between and intermediate the ends of the two spaced parallel shafts therein for dividing power delivered to one of the two propeller shaft sections in said through drive axle between the other of said sections and the two spaced parallel shafts in said through drive axle.

7. A dual driving axle unit comprising a through drive axle and a final drive axle, a differential gear case mounted in each axle, two worm gears rotatable with the differential gear case of each axle, two spaced parallel shafts mounted in each axle and having worms thereon intermeshing with the two worm gears of said axle, a propeller shaft extending from axle to axle between the two worm shafts therein, said propeller shaft comprising two sections journaled in the through drive axle, a section leading to the final drive axle and a section journaled in said last mentioned axle, and a differential driving mechanism mounted in the through drive axle between and intermediate the ends of the two worm shafts therein for dividing power delivered to one of the two propeller shaft sections in said through drive axle between the other of said sections and the two worm shafts in said through drive axle.

HERBERT W. ALDEN.